United States Patent [19]
Claussen et al.

[11] 3,975,291
[45] Aug. 17, 1976

[54] PROCESS FOR PRODUCING LASER LIGHT

[75] Inventors: Uwe Claussen, Leverkusen; Günter Oppermann, Cologne, both of Germany

[73] Assignee: Bayer Aktiengesellschaft, Leverkusen, Germany

[22] Filed: Mar. 1, 1974

[21] Appl. No.: 447,210

[30] Foreign Application Priority Data
Mar. 3, 1973  Germany............................ 2310748

[52] U.S. Cl.................... 252/301.17; 260/240.1; 260/308 A; 260/343.2 R; 331/94.5 L
[51] Int. Cl.².................... H01S 3/20; F21K 2/00
[58] Field of Search .................... 252/301.2 R; 260/343.2 R, 308 A, 240.1; 331/94.5 L

[56] References Cited
UNITED STATES PATENTS
3,521,187    7/1970    Snavely et al. ................. 331/94.5 L
3,774,122    11/1973   Webster .......................... 331/94.5 L
3,781,711    12/1973   Drexhage et al. .............. 331/94.5 L FOREIGN PATENTS OR APPLICATIONS
2,016,470    10/1971   Germany OTHER PUBLICATIONS
"Dye Lasers," Edited by F. P. Schafer, Springer Verlag, Berlin, 1973, pp. 180–193.

Primary Examiner—John H. Mack
Assistant Examiner—Aaron Weisstuch
Attorney, Agent, or Firm—Plumley & Tyner

[57] ABSTRACT

Laser light of different wavelength can be produced by exciting sparingly water soluble fluorescent compounds of which the $\Delta\Delta$ m value is less than 0.300 and of which the molecular symmetry is either of symmetry group $C_s$ or of a higher symmetry group than this, the fluorophor having to form a rigid system if the compound belongs to symmetry group $C_s$, the compounds being present in concentrations of between $10^{-1}$ and $10^{-5}$ mol/l in organic solvents.

3 Claims, No Drawings

PROCESS FOR PRODUCING LASER LIGHT

The subject of the invention is a process for the production of coherent monochromatic radiation (laser light), using sparingly water-soluble fluorescent compounds of which the $\Delta\Delta m$ value is less than 0.300 and of which the molecular symmetry is either of symmetry group $C_s$ or of a higher symmetry group than this, the fluorophor having to form a rigid system if the compound belongs to symmetry group $C_s$.

The process is further characterised in that the fluorescent compounds, present in concentrations of between $10^{-1}$ and $10^{-5}$ mol/l in organic solvents, are excited with light of sufficient intensity and suitable wavelength. With the inventive process laser light with different wavelength in the blue spectral region corresponding to the involved fluorescent compound is available.

The procedure for measuring $\Delta\Delta m$ involves measuring the increase of the extinction in the visible or ultraviolet range of the spectrum as compared with the extinction of the donator (D) and acceptor (A), i.e. in determining the extinction module which is suitable for comparing different complexes of the same kind. The following measuring parameters are fixed for establishing the module:

[Do]=$10^{-3}$ molar=donor (brightening agent) concentration

[Ao]=2.7 molar=acceptor concentration

In conducting the necessary measurements dioxane is used as the solvent and 1,3-dinitrobenzene is used as the acceptor.

The $\Delta\Delta m$ value is determined by measuring at a layer thickness $t[=1$ cm.$]$ and a measuring temperature of 20°C., the extinction differences $\Delta E$ in the absorption flanks at 450 and 550$\mu$:

$\Delta E$ 450-500, total=E450 total−E 500 total

Since the complex AD adsorbs longer waves than the components A and D, the change of extinction depends on the formation of the complex AD and is defined as folows:

$\Delta\Delta E$ 450-500 AD=$\Delta E$ 450-500 total−$\Delta E$ 450-500 A−$\Delta E$ 450-500 D  $\Delta\Delta E$ 450-500 AD=$\Delta\Delta m$ 450-500 AD To simplify the notation, the indices are left out in the following and instead of $\Delta\Delta m$ 450-500 AD only $\Delta\Delta m$ is used.

A definition of the term fluorophor and the systems in question are to be found, for example, in H. Gold, The Chemistry of Synthetic Dyes, edited by K. Venkataraman, volume 5, page 535 et seq., Academic Press, New York 1971.

The terms symmetry group or point group are here intended to denote the customary system for the classification of the symmetry properties of molecules, as presented in detail, for example, in the monograph by H. H. Jaffe and M. Orchin, Symmetrie in der Chemie (Symmetry in Chemistry), Huthig Verlag, Heidelberg 1967.

The concept of a "rigid system" is derived from the knowledge that aromatic molecules define, by the nodes of the p-orbitals of the atoms participating in the $\pi$-system, a plane which requires a very high energy to distort or twist. Two such systems coupled by a single bond can be twisted comparatively easily relative to one another. In order to convert the system into a rigid system, a further bond must be provided between the two parts of the molecule, or the rotation of the two parts of the molecule relative to one another must be hindered by substitution of the ortho-positions relative to the linkage position. Thus, for example, stilbene formally becomes the rigid system of coumarin or carbostyril or $\alpha,\omega$-diphenylbutadiene becomes 2,5-diphenylthiophene or 2,5-diphenylfurane.

Suitable fluorescent compounds with a higher symmetry than $C_s$ are, for example: 4,4'-benzoxazolylstilbenes, $\alpha,\beta$-bisbenzoxazolyl-ethylenes and 1,5-bisbenzoxazolylthiophenes, which can optionally also be substituted further. Suitable fluorescent compounds with $C_s$-symmetry are 3-aryl-7-triazolylcoumarins or -carbostyrils, 3-heteryl-7-triazolyl-coumarins or -carbostyrils, naphthalimides or pyrene compounds which can optionally be substituted further.

Amongst the fluorophors, the benzoxazolyl-substituted and 2-(1,2,3)-triazolyl-substituted fluorophors are particularly valuable.

The solubility of the compounds should be less than 5 g in 1 l of water.

Organic solvents which can be used are aliphatic compounds which are liquid below 30°C and are free from nitrogen and halogen and aromatic compounds which are liquid below 30°C, free from nitrogen and halogen, and unsubstituted or substituted by 1st order substituents.

Preferred aliphatic solvents are solvents which contain oxygen in the form of one or more ester, ketone or ether groupings. As examples there may be mentioned acetone, formic acid ethyl ester, butanone-2, cyclohexane, cyclohexanone, decalin, diethyl carbonate, diisoamyl ether, dioxane, ethyl acetate, acetic anhydride, glycol diacetate, glycol monomethyl ether, malonic acid diethyl ester, tetrahydrofurane and methyl tert.-butyl ether.

Examples of suitable aromatic solvents are anisole, benzene, styrene, tetralin, toluene and xylene.

These solvents can be used by themselves or as mixtures with one another or as mixtures with water, but water itself or mixtures which contain more than 40 per cent by volume of water are unsuitable.

The solubility in water of the compounds claimed here is so low that the saturated solutions only retain a weak fluorescence and are no longer capable of laser emission.

The concentration of the fluorescent compounds in the solutions capable of use for lasers can be between $10^{-5}$ and $10^{-1}$ mol/l but optimum results are obtained with concentrations of $10^{-3}$ to $10^{-4}$ mol/l. The wavelength of the stimulated emission is practically independent of the concentration. It can be selected, within the fluorescence emission range, if an optical element for wavelength selection, for example a diffraction grating, is placed in the path of the beam.

Details on the nature of suitable excitation light sources, where they are not given in the examples which follow, are to be found in the LASER Handbook, published by F. T. Arecchi and E. O. Schulz-Dubois, North Holland Publishing Co., Amsterdam 1972.

There are several uses for laser light, e.g. for drilling, welding and cutting. A further potential application is the field of communications and the isotope separation.

EXAMPLE 1

A fluorescent cell (10 × 10 mm base area), which is not mirror-coated, is filled with a $10^{-3}$ molar solution of 3-phenyl-7-[2-(4-methyl-5-phenyl)]-1,2,3-triazolyl-coumarin in dioxane as the active laser medium, in a modified Schäfer laser apparatus (Angew. Chem., 82, 25 (1970). To excite the dyestuff solution, the UV radiation of a doubled-frequency ruby laser (wavelength = 347 nm) is focused into the cell by means of a cylindrical lens to form a narrow horizontal focus spot of dimensions approx. 0.5 × 8 mm. If the ruby laser, working in "Q-switch operation," has an output of 1.4 Joules, a UV impulse of approx. 50 mJ and having a half-life of 20 nsec is produced in an 8 cm long potassium dihydrogen phosphate crystal (KDP crystal). Under these excitation conditions, a stimulated fluorescence radiation in the form of a narrowly defined beam of approx. 1 mm diameter is emitted from the two lateral windows of the cell, at right angles to the direction of incidence of the UV pump light. In this arrangement, the plane-parallel glass walls of the fluorescent cell act as a laser resonator of which the mirror has a reflectivity of approx. 4%.

The radiation from the dyestuff laser was analysed in a spectral apparatus and its variation with time was observed using a Korad photodiode and a Tetronix oscillograph (type 519). Furthermore it was possible to measure not only the excitation energy but also the energy of the dyestuff laser impulse by means of a calorimeter (thermopile). It was about 1 mJoule. The wavelength of the stimulated fluorescence radiation was 430 nm for a band width of approx. 3 nm. The peak impulse output of the dyestuff laser was 80 KW.

EXAMPLES 2–10

The procedure indicated in Example 1 is followed and instead of 3-phenyl-7-[2-(4-methyl-5-phenyl)-1,2,3-triazolyl]-coumarin, one of the following compounds, dissolved in dioxane at the concentration indicated, is used:

|  | $R_1$ | $R_2$ | $R_3$ | Laser wavelength (nm) | Laser intensity (KW) | Concentration (mol/liter) |
|---|---|---|---|---|---|---|
| Example 2 | pyrazolyl | | 2-CH_3, 3-OC_4H_9 phenyl | 430 | 140 | $10^{-3}$ |
| Example 3 | pyrazolyl | | methylindenyl | 436 | 120 | $10^{-3}$ |
| Example 4 | 1,2,3-triazolyl | $CH_3$ | $C_2H_5$ | 412 | 75 | $10^{-3}$ |
| Example 5 | Cl-pyrazolyl | | phenyl-$CH_3$ | 430 | 140 | $10^{-3}$ |
| Example 6 | Cl-pyrazolyl | $CH_3$ | H | 425 | 35 | $10^{-3}$ |
| Example 7 | Cl-pyrazolyl | | methylindenyl | 435 | 120 | $10^{-3}$ |

|  | | Laser wavelength (nm) | Laser intensity (KW) | Concentration (mol/liter) |
|---|---|---|---|---|
| Example 8 | $OCH_3$–benzoxazolyl–phenyl–CH=CH–phenyl–benzoxazolyl–$OCH_3$ | 450 | 25 | $10^{-4}$ |
| Example 9 | naphthotriazolyl–phenyl(CN)–CH=CH–triazolyl–phenyl | 425 | 90 | $10^{-3}$ |

-continued

| | Laser wavelength (nm) | Laser intensity (KW) | Concentration (mol/liter) |
|---|---|---|---|
| Example 10 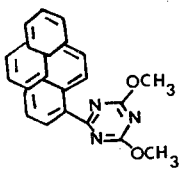 | 440 | 40 | $10^{-3}$ |

EXAMPLE 11

The procedure indicated in Example 1 is followed except that in place of 3-phenyl-7-[2-(4-methyl-5-phenyl)-1,2,3-triazolyl]-coumarin, solutions of 3-phenyl-7-[2-(5-methyl-6-butoxy)-1,2,3-benztriazolyl]-coumarin in dioxane, of the following concentrations, are employed:

| Concentration mol/l | Laser wavelength nm | Laser intensity KW |
|---|---|---|
| $10^{-3}$ | 439 | 160 |
| $5 \cdot 10^{-4}$ | 439 | 80 |
| $10^{-4}$ | 438 | 14 |
| $5 \cdot 10^{-5}$ | 437 | 5.5 |

It can be seen that the laser wavelength does not change with the concentration.

EXAMPLE 12

The procedure indicated in Example 1 is followed and using a UV impulse of 70 mJ the laser outputs shown in the table are obtained if the following solvents are used in place of dioxane in Example 1:

| Acetone | 140 KW |
|---|---|
| Ethanol | 45 KW |
| Maleic acid diethyl ester | 140 KW |
| Carbonic acid diethyl ester | 200 KW |
| Glacial acetic acid | 80 KW |
| Benzene | 140 KW |
| Toluene | 220 KW |
| Methyl tert.-butyl ether | 135 KW |

We claim:

1. Process for producing coherent monochromatic radiation by exciting a 2-(1,2,3)-triazolyl-substituted fluorescent compound in a concentration of $10^{-1}$ to $10^{-5}$ mole/liter in an organic solvent with light of sufficient intensity and wavelength, wherein said fluorescent compound has a water solubility of less than 5 g. in 1 liter of water, a $\Delta\Delta m$ value of less than 0.300, and a molecular symmetry higher than $C_s$ or if the molecular symmetry is of the group $C_s$ the fluorescent compound forms a rigid system.

2. Process of claim 1 in which said organic solvents are nitrogen-free and halogen-free aliphatic compounds liquid below 30°C or nitrogen-free and halogenfree aromatic compounds which are liquid below 30°C and which are unsubstituted or substituted by 1st order substituents.

3. Process of claim 1 in which the concentration of the fluorescent compounds is between $10^{-3}$ and $10^{-4}$ mole/liter.

* * * * *